Oct. 3, 1933.  W. B. STOUT  1,928,915
CONTROL DEVICE
Filed April 27, 1932   2 Sheets-Sheet 1
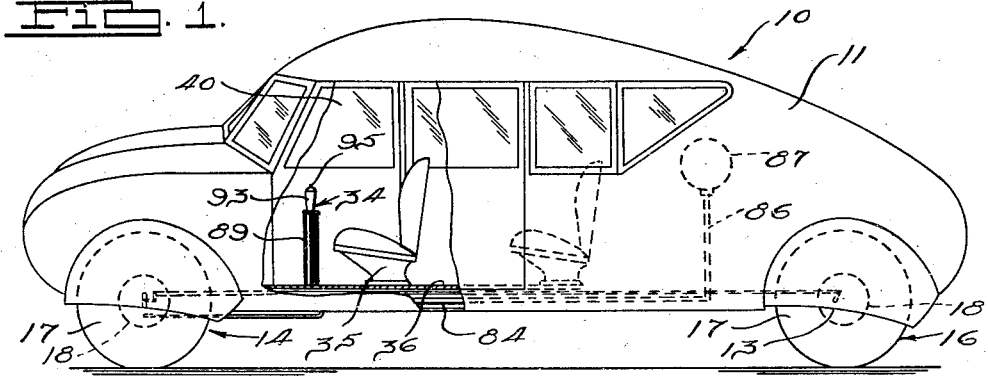
Fig. 1.
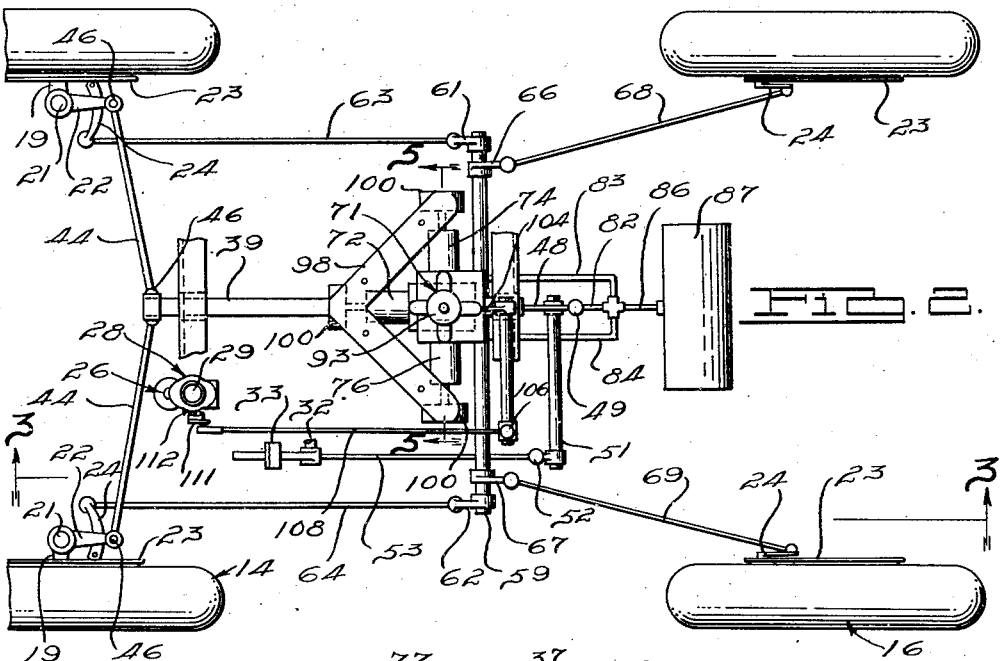
Fig. 2.
Fig. 3.
INVENTOR
William B. Stout.
BY
ATTORNEYS.

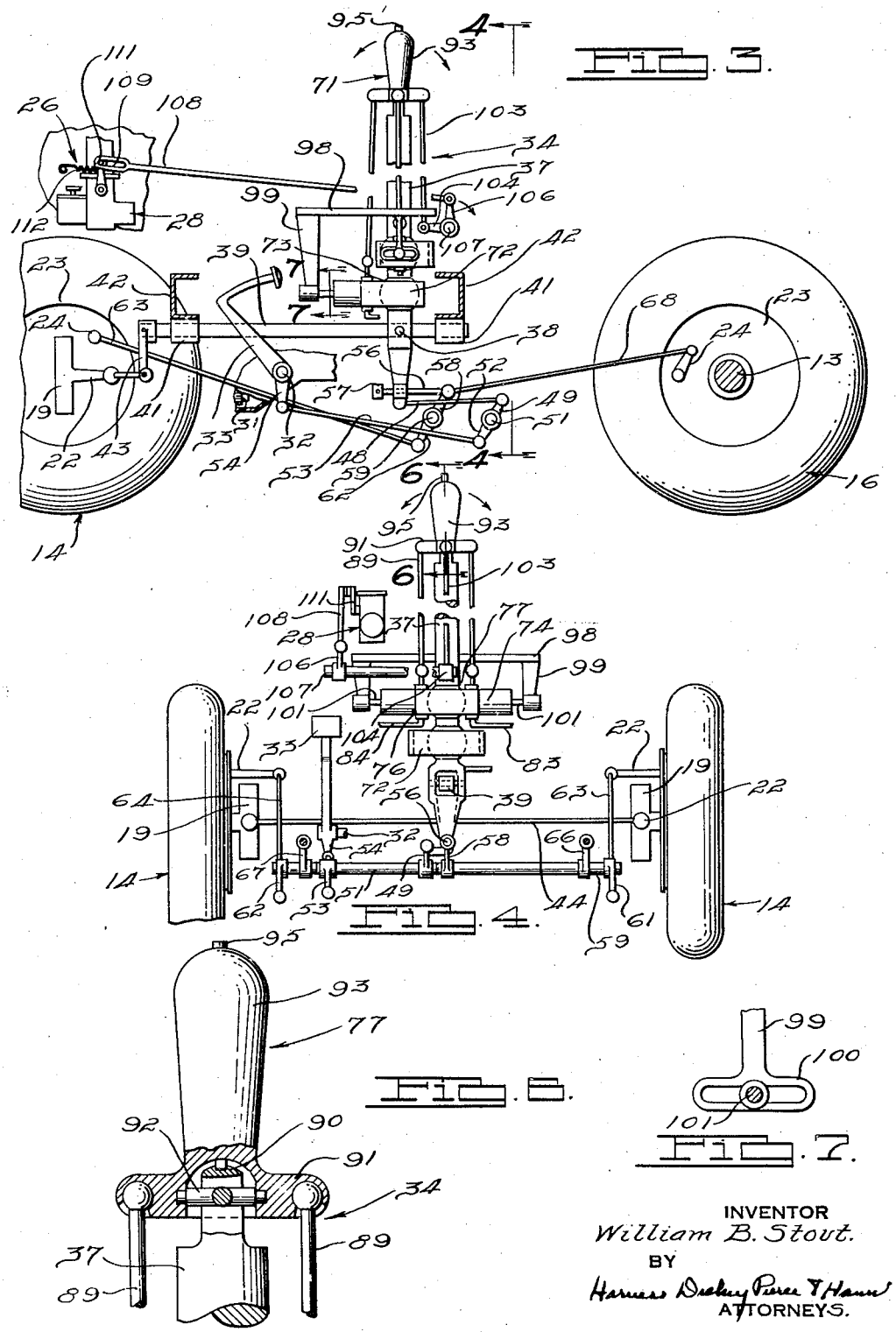

Patented Oct. 3, 1933

1,928,915

UNITED STATES PATENT OFFICE 1,928,915

CONTROL DEVICE

William B. Stout, Detroit, Mich.

Application April 27, 1932. Serial No. 607,813

7 Claims. (Cl. 180—77)

This invention relates to control mechanism and has particular relation to unitary mechanism for controlling the operation of the various auxiliary mechanisms associated with motor vehicles, airplanes or the like.

In the operation of motor vehicles equipped with large low-pressure pneumatic wheels, it has been found difficult to turn the wheels thereof to one side or another owing to the extreme flexibility of the tire casings employed and to the tendency of such casings to flatten excessively under the weight of the vehicle and thus to provide a large area of tire casing surface in contact with the ground. When ordinary steering mechanism is employed it is necessary either to apply a considerable force thereto to turn the wheels or to so increase the steering mechanism ratio that an excessively large amount of angular movement of the mechanism is required to produce a small amount of annular movement of the wheels. Also it has been customary heretofore to employ separate mechanisms for steering, operating the accelerator, applying the brakes and clutch and all of which require both the hands and feet of the vehicle operator in the operation thereof.

The principal objects of this invention are to combine the controlling mechanism for the numerous auxiliary devices employed in the operation of an automobile or airplane into a single unitary controlling device which can be operated by the vehicle operator with one hand; to provide a source of energy other than that applied by the vehicle operator for mechanically actuating such controlling device to effect the operation of the aforesaid auxiliary devices; and in general to provide a power actuated, so-called "joy-stick" for automatically controlling the operation of an automobile or airplane in response to the manipulation of a single, easily controlled operating device.

A further object of the invention is to provide a power actuated steering mechanism by which the dirigible wheels of a motor vehicle can be moved to any desired extent by a slight operating movement of the steering mechanism and in which the movement thereof is continuous until the steering mechanism is again actuated to discontinue the angular movement of the wheels.

The embodiment of the invention disclosed for the purpose of illustration comprises generally a lever mounted universally intermediate its ends upon a bar and in such manner that movement of the lever transversely of the bar will rotate the latter for steering the vehicle while movement thereof longitudinally of the bar will simply result in pivotal movement of the lever relative to the bar and as a result of which the brakes, clutch, and throttle of the motor vehicle will be operated according to the direction and extent of movement of the lever relative to the bar. Instead of being operated directly by the operator of the vehicle, the lever is actuated in response to the movement of an operating mechanism mounted thereon which controls a flow of fluid under pressure effecting a plurality of cylinders associated with the lever for moving the lever in response to the operation of the actuating mechanism. When the control mechanism is actuated to the right or left the vehicle will continue to turn to the right or left until the operation of the mechanism is interrupted by the vehicle operator when the desired angular movement of the wheels has been attained. When the controlling mechanism is operated forwardly from any position in which the actuating lever may be disposed the throttle of the engine will be opened in proportion to the movement of the controlling mechanism. When the controlling mechanism is actuated rearwardly, the actuating lever will first disengage the clutch and then apply the brakes of the vehicle unless the operation of the mechanism is interrupted by a slight forward movement thereof at an intermediate position.

For a better understanding of the invention reference may now be had to the accompanying drawings forming a part of this specification, in which—

Figure 1 is a side elevational view of a motor vehicle embracing the principles of the invention with a portion of the body thereof broken away in order to illustrate the vehicle controlling mechanism;

Fig. 2 is a diagrammatical illustration of the application of a vehicle controlling mechanism to the motor vehicle disclosed by Fig. 1;

Fig. 3 is a side elevational view of the diagrammatically illustrated mechanism disclosed by Fig. 2;

Fig. 4 is a transverse sectional view of the structure disclosed by Figs. 2 and 3 as it might appear from line 4—4 of Fig. 3, looking in the direction of the arrows thereon;

Fig. 5 is a fragmentary partly cross-sectional, partly elevational view of the controlling mechanism taken substantially on line 5—5 of Fig. 2, looking in the direction of the arrows thereon;

Fig. 6 is a fragmentary view partly in section, and partly in elevation as the controlling mechanism might appear substantially in the plane of line 6—6 of Fig. 4 and looking in the direction of the arrows thereon.

Fig. 7 is a fragmentary cross sectional view of the operating mechanism taken substantially on line 7—7 of Fig. 3.

Referring particularly to the drawings, a motor vehicle 10 embracing the invention comprises an enclosed stream lined body 11 having usual front and rear axles for supporting the body upon wheels 14 and 16 associated with the opposite ends of the axles. The wheels embrace large and flexible pneumatic cushion tires 17, adapted to run at relatively low inflation pressure and detachably secured to hubs 18. The front wheels 14 are mounted for dirigible operation upon spindles 19 pivotally secured to the vehicle body as at 21 and about which pivotal connections the spindles are adapted to be rotated by arms 22 projecting rearwardly therefrom.

In the present instance all of the wheels of the vehicle are provided with brakes 23 although it is apparent that any number of wheels less than the total number thereof may be provided with such brakes. The brakes all are provided with operating levers 24 by which they may be operated for decreasing the speed of the vehicle or rendered inoperable for such purpose.

The vehicle 10 comprises an engine, a portion of which is indicated at 26 and to which a combustible mixture of fuel and air is supplied by a charge forming device 28 which in turn is controlled by the operation of a throttle 29. The engine also is provided with a clutch 31 having an actuating shaft 32 by which the clutch may be manually actuated if desired by a clutch pedal 33.

In order to be able to operate any of these or other auxiliary mechanisms embraced within the motor vehicle, the latter is provided with a controlling mechanism 34 which projects vertically from the floor 36 of the body 11 within the passenger compartment 40 therein and in a region immediately in front of the front seat 35 therein where such mechanism is within reach of the vehicle operator.

This mechanism comprises an actuating lever 37 pivotally mounted upon a pin 38 to oscillate either forwardly or rearwardly upon a bar 39, the opposite ends of which are rotatably mounted in bearings 41 rigidly secured to frame members 42 embraced in the body 11. When the lever 37 is moved either forwardly or rearwardly at the upper end thereof, it merely pivots upon the pin 38 and the movement of the lower end of the lever in the opposite direction results. When the upper end of the lever is moved to one side or the other, however, the pin 38 rotates the bar 39 within the bearings 41.

Such rotation of the bar 39 is employed in steering the vehicle through the mechanism of an arm 43 secured rigidly to the forward end of the bar and connected at the lower and movable end thereof to a pair of rods 44, the opposite ends of which are in turn connected to the arms 22 by which the steering of the front wheels 14 is controlled. The opposite ends of the rods 44 are universally connected to the arm 43 and the arms 22 by universal joints indicated at 46.

It will be apparent that when the upper end of the lever 37 is moved to the right from its normal vertical and intermediate position, for example, that the front wheels 14 will be moved to turn the vehicle to the right and in proportion to the movement of the lever. Likewise, the motor vehicle is turned to the left by a corresponding movement of the lever 37 to the left of its normal intermediate position.

The lower end of the lever 37, beneath the bar 39, is connected by a link 48 to an upwardly projecting arm 49 rigidly secured to a shaft 51 which is rotatably mounted in the frame embraced in the body 11. Projecting in a direction opposite to the lever 49 and also secured rigidly to the shaft 51 is a lever 52 which is pivotally connected by a link 53 to an arm 54 secured to the clutch shaft 32 adjacent the clutch operating lever 33. When the lever 37 is moved, by the vehicle operator, rearwardly from its normal intermediate position, the forward movement of the lower end of the lever disengages the clutch 31 through the operation of the mechanism by which the lever is connected to the clutch shaft 32. It is to be understood that the clutch is disengaged by the initial movement of the lever 37 rearwardly from its normal position although the lever can be moved rearwardly to a much greater extent without any consequence to the clutch other than the further disengagement of its elements.

Slidably mounted in an opening formed transversely in the lower extremity of the lever 37 is a rod 56 having a stop 57 secured rigidly thereon adjacent the front face of the lever. The rear end of this rod is pivotally secured to the outer end of an upwardly projecting arm 58 secured rigidly upon a rotatably mounted shaft 59 from which extend downwardly, adjacent the opposite ends thereof, arms 61 and 62 likewise rigidly secured thereto. The lower ends of these arms are secured pivotally to links 63 and 64 respectively which in turn are secured pivotally at their opposite ends to the brake operating levers 24 of the brakes on the front vehicle wheels. Also secured rigidly to the shaft 59 is another pair of levers 66 and 67 mounted on the shaft ends adjacent the levers 61 and 62 respectively but projecting from the shaft in a direction opposite to that of the first mentioned pair of levers. The upper ends of the levers 66 and 67 are respectively pivotally connected by links 68 and 69 to the brake operating levers 24 of the rear vehicle wheels.

The stop 57 is so positioned upon the rod 56 that when the actuating lever 37 has been moved rearwardly far enough to disengage the elements of the clutch 31, the stop will be engaged by the forward surface of the lower end of the lever and thereafter the vehicle brakes will be applied to any desired extent and in proportion to the further rearward movement of the lever 37.

Rather than to depend for actuation of the lever 37 upon force applied directly by the vehicle operator, the invention contemplates also the operation of the lever by a pressure actuating device 71. This device comprises principally a forwardly disposed air cylinder 72 universally mounted as is indicated at 73 upon the lever 37 above the bar 39 and a pair of laterally disposed air cylinders 74 and 76 likewise universally mounted as is indicated at 77, upon the lever 37 above the bar 39. The cylinders 72, 74 and 76 each comprise a vertically disposed valve casing 78 in a cylindrical opening in which is slidably mounted a piston valve 79. One end of all the valve casings is vented to the atmosphere by ports indicated at 81, while the opposite ends thereof are connected by conduits 82, 83 and 84 to a main compressed air supply conduit 86 communicating with a compressed air supply tank 87. A compressor, not shown, may be employed in the vehicle for maintaining a suitable supply of air under pressure in the pressure tank 87 or the latter may be provided with an air connection whereby the tank may be filled with air at filling stations when the fuel tank of the vehicle is filled. The piston valves 79 in the valve casings 78 are provided with operating rods 88 which project outwardly through the upper ends of the valve casings and there are universally connected to operating rods 89. The opposite ends of the rods 89 are in turn universally connected to a head 91 which is mounted centrally, by means of a universal coupling 92, upon the upper end of the actuating lever 37. The position of the head 91 relative to the lever 37 is determined by an operating handle 93 secured rigidly to the center of the head and projecting upwardly therefrom. A detent mechanism 95, cooperating with an opening formed in an upper end portion 90 of the lever 37 is employed for maintaining the operating handle in its intermediate and inoperative position. Formed substantially centrally of the heads of the cylinders 72, 74 and 76 are ports 94 by which the cylinders are adapted to communicate with the interiors of the valve casings 78. It is to be understood that the operating handle 93 may be in the form of a wheel if desired.

All of the elements connecting the piston valves 79 and the head 81 are of such equal lengths that when the head 91 is disposed in a plane substantially parallel to the axes of cylinders 72, 74 and 76, the piston valves 79 all cover the ports 94 and consequently prevent the communication of the cylinders either with the supply tank 87 through the conduits therebetween or with the atmosphere through the ports 81. The cylinders 72, 74 and 76 all are provided with pistons 96 which are slidably mounted therein and in the intermediate position of the lever 37 occupy positions substantially midway between the opposite ends of the cylinders.

Secured rigidly to the body 11 is an angularly formed frame 98 having arms 99 projecting downwardly therefrom in front of the open end of the cylinders 72, 74 and 76 and the lower ends of which are provided with horizontally disposed fixed guides 100 each extending transversely with respect to the axis of the cylinder adjacent which it is located. In each of these guides the outer end of a piston rod 101 is so secured as to permit lateral sliding movement thereof while being maintained against axial movement. The inner end of each piston rod 101 is fixed to a piston 96 within the corresponding of the cylinders 72, 74 and 76. By reason of the guides 100, which are fixed relative to the body 11, the pistons and cylinders can move bodily laterally but only the cylinders can move relative to the body along their axes. Upon the introduction of compressed air into any cylinder the movement of such cylinder will tend to move the actuating lever 37 in one direction or another. Owing to the universal connection of the cylinders 72, 74 and 76 relative to the lever 37, the pistons 96 slidably mounted therein and rigidly secured to the rods 101 always will maintain the cylinders in the same plane relative to the body 11 and notwithstanding the angle at which the lever 37 may be disposed.

On the side of the head 91 opposite that connected to the valve for the cylinder 72, is universally secured, a downwardly projecting rod 103, the lower end of which is pivotally secured to one of a pair of arms 104 and 106 which are mounted upon a rotatable shaft 107. The free end of the arm 106 is pivotally connected to the throttle 29 of the engine by a rod 108 having a slot 109 formed in the opposite end thereof which is adapted to receive slidably the operating end of the throttle operating arm 111. A spring 112 secured between the lever 111 and the engine 26 tends to maintain the throttle operating arm against a stop and in which position the throttle 28 is set at engine idling speed. With the throttle in such position and the actuating lever 37 and operating handle 93 in the normal intermediate positions thereof, the actuating arm 111 of the throttle 29 engages the end of the slot 109 in the throttle operating rod 108.

In the operation of the vehicle, after the engine has been started and it is desired to drive the vehicle forwardly, for example, the clutch pedal 33 may be depressed and the gear shifting mechanism of the vehicle operated in the normal manner. Simultaneously with the release thereafter of the clutch pedal 33 to engage the elements of the clutch 31, the controlling handle 71 is pushed forwardly to a slight extent and the engine is opened to a somewhat greater extent by the resultant movement of the rods 103 and 108 and the arms 104 and 106. Such forward movement of the operating handle 93 also depresses the valve 79 controlling the operation of the cylinder 72 but, inasmuch as such movement merely tends further to move the valve into a position beyond the port 94, the movement has no effect upon the operation of the cylinder 72 nor the position of the actuating lever 37. After the clutch has been thus engaged the operating handle 93 can be tilted still farther forwardly to speed up the engine to any desired extent and until it is considered an appropriate time to simultaneously depress the clutch pedal 33 and return the operating lever 93 to its original position, in preparation for shifting the gears for subsequent operation of the vehicle at a higher speed.

During such movement of the car in low gear the position of the actuating lever 37 is not affected unless it is desired to turn the vehicle one way or another by the operation of the steering mechanism. For example, should it be desirable to turn the car to the right the operating handle 93 is simply moved to the right and held in such angular position until the wheels are turned at a proper angle and thereafter the handle is again moved into its normal intermediate position. The handle may be moved in this manner even though it has been previously tiltled forwardly to any desired extent in the operation of the throttle. As a result of said movement of the handle to the right, the head 91 is proportionally elevated on the left hand side and consequently the valve controlling cylinder 76 is pulled upwardly beyond the port 94 for such cylinder and compressed air from the tank 87 flows into the cylinder through the port 94. While the valve 79 controlling the flow of air to the cylinder 74 is also moved in response to the movement of the head 91, such valve is merely moved downwardly beyond the port 94 controlling the cylinder and, while in this position still prevents the flow of air from the tank 87, although it does open communication between the interior of the cylinder and the atmosphere. Under such conditions the air from the tank 87 flowing into the cylinder 76 moves the cylinder away from the piston 97 which in turn moves the actuating lever 37 to the right upon the bar 39 and some of the air is expelled from the cylinder 74 by the movement of the latter toward the piston therein. The rotation of the rod 39 resulting from the movement of all the cylinders 72, 74 and 76 to the right, as a result of the admission of air into the cylinder 76, will continue to turn the wheels to turn the car to the right until the operating handle 93 is moved to the left far enough that the head 91 will again lie in a plane parallel to the three cylinders 72, 74 and 76. As a result of such movement, the valve 79 will again close the port 94 and will discontinue the communication between any of the cylinders and either the tank 87 or the atmosphere.

After the gears have been shifted to a higher speed, and, as a result of the engagement of the clutch 31 the engine is again employed for driving the car, the speed of the car may be varied to any desired extent merely by pushing forwardly upon the operating handle 93. In any position of such handle the car may be turned in either direction by moving the handle in such direction and then back again into its intermediate position.

If it is desired to turn the car to the right to a slight extent and then to again drive forwardly, for example, the operating handle 93 is merely shifted first to the right and then to the left and as a result the actuating lever 37 will move to the right and then back again into its normal intermediate position.

When it is desired to stop the motion of the vehicle, the handle 93 is pulled rearwardly to its normal intermediate position to close the throttle of the engine and then moved beyond such intermediate position still farther rearwardly until the tilting movement of the head 91 causes the opening of the valve 79 controlling the cylinder 72. Thereafter air from the tank 87 will flow into the cylinder which will then be pushed away from the piston 96 therein and as a result of which the actuating lever 37 will pivot rearwardly upon the pin 38. The resultant forward movement of the lower end of the lever will first disengage the clutch 31 by the operation of the rods 48 and 53 and thereafter the engagement of the lever with the stop 57 will forcibly apply the brakes on all the vehicle wheels through the movement of the various levers and rods by which the brakes are controlled.

If it is desired to disengage the clutch but not to apply the brakes, the operating handle 93 is pushed forwardly to its normal intermediate position as soon as the actuating lever 37 has been moved rearwardly far enough to permit the clutch elements to disengage. It is to be understood, of course, that the gears can be shifted either from this position of the actuating lever 37 or from the position of the lever in which the brakes of the vehicle are fully applied and the car may be started merely by pushing forwardly upon the operating handle 93 and without employing the clutch pedal 33. In the event it is considered desirable to start the car in this manner the clutch operating pedal either may be eliminated entirely or may be left in the car for operation whenever desired.

It is to be observed that, by reason of the type of valves which are employed for controlling the flow of compressed air into the cylinders 72, 74 and 76, it is necessary after having moved the controlling handle 93 in one direction, in order to move the actuating lever 73, again to move the controlling handle in the opposite direction, in order to discontinue the movement of the actuating lever. However, the actuating lever may be made to have movement in any direction proportional to the movement of the operating handle 93 in the same direction, merely by employing other well known valves for automatically cutting off the flow of compressed air to the cylinders after the movement of the operating handle 93 is discontinued.

While the structure herein disclosed constitutes a preferred form and application of the invention, it is to be understood that the invention may be embraced in various modified and equivalent structures within the scope of the invention as defined by the appended claims.

I claim:

1. The combination of a body having a movable controlling mechanism mounted therein, power actuated means for moving said controlling mechanism in one direction for controlling the direction of motion of said body and power actuated means for moving said controlling mechanism in a different direction for controlling the rate of motion of said body.

2. The combination of a body having a controlling mechanism mounted therein, power actuated means for moving said controlling mechanism in one direction for controlling the direction of motion of said body, power actuated means for moving said controlling mechanism in a different direction for controlling the rate of motion of said body and a single universally movable means for controlling said power actuated means.

3. The combination of a body having a universally operable lever disposed therein, said lever having a universally mounted controlling head and a universally mounted piston and cylinder mechanism secured therein, and means responsive to variations in the angular relation of said controlling head and said piston and cylinder mechanism for actuating said lever.

4. The combination of a body having a universally movable lever mounted therein, a controlling handle universally mounted on said lever, said controlling handle and said lever having a normally inoperative intermediate position and means responsive to the movement of said controlling handle for moving said lever for actuating the operating mechanism of said body.

5. The combination of a body having an actuating lever universally mounted therein, a controlling handle universally mounted on said actuating lever, means responsive to the lateral movement of said controlling handle for laterally moving said actuating lever, and means responsive to the lateral movement of said lever for controlling the direction of motion of said body.

6. The combination of a body having an actuating lever universally mounted therein, a controlling handle universally mounted on said actuating lever, means responsive to the universal movement of said controlling lever for universally moving said actuating lever, and means responsive to the universal movement of said actuating lever for controlling the direction and rate of motion of said body.

7. In combination of a body having a lever projecting upwardly therein and accessible to the operator of said body, a universally mounted controlling handle upon the upper end of said lever, and means responsive to the universal movement of said controlling handle for controlling the operation of said body.

WILLIAM B. STOUT.